United States Patent [19]
Phillips

[11] Patent Number: 5,302,026
[45] Date of Patent: Apr. 12, 1994

[54] TEMPERATURE PROBE WITH FAST RESPONSE TIME

[75] Inventor: Richard W. Phillips, Eagan, Minn.

[73] Assignee: Rosemount, Inc., Inver Grove Heights, Minn.

[21] Appl. No.: 56,571

[22] Filed: Apr. 29, 1993

Related U.S. Application Data

[63] Continuation of Ser. No. 915,016, Jul. 16, 1992, abandoned.

[51] Int. Cl.$^5$ ............... G01K 13/02; G01K 1/16; G01K 1/18
[52] U.S. Cl. ................. 374/135; 374/138; 374/148
[58] Field of Search ............ 374/135, 138, 148

[56] References Cited

U.S. PATENT DOCUMENTS

| | | | |
|---|---|---|---|
| 2,450,263 | 9/1948 | Wise . | |
| 2,496,806 | 2/1950 | Moffatt | 374/138 |
| 2,588,840 | 3/1952 | Howland | 374/138 |
| 2,750,798 | 6/1956 | Ruskin et al. | 374/135 |
| 2,930,827 | 3/1960 | Schunke | 374/138 |
| 2,931,227 | 4/1960 | Werner et al. | 374/138 |
| 2,970,475 | 2/1961 | Werner | 374/138 |
| 2,971,997 | 2/1961 | Carrico | 374/138 |
| 3,170,328 | 2/1965 | Werner et al. . | |
| 3,174,342 | 3/1965 | Werner et al. . | |
| 3,623,367 | 11/1971 | Benedict | 374/135 |
| 4,047,379 | 9/1977 | Brookes et al. | 374/135 |
| 4,152,938 | 5/1979 | Danninger . | |
| 4,279,153 | 7/1981 | Kervistin et al. | 374/138 |
| 4,398,169 | 8/1983 | Hayashi | 338/25 |
| 4,547,079 | 10/1985 | Alamprese et al. | 374/138 |
| 4,953,986 | 9/1990 | Olson et al. | 374/136 |
| 4,991,976 | 2/1991 | Byles | 374/135 |
| 5,062,571 | 11/1991 | Arno et al. | 374/148 |

FOREIGN PATENT DOCUMENTS

| | | | |
|---|---|---|---|
| 0128318 | 7/1985 | Japan | 374/138 |
| 0080021 | 4/1986 | Japan | 374/138 |
| 0091532 | 5/1986 | Japan | 374/138 |
| 0234709 | 1/1969 | U.S.S.R. | 374/138 |
| 0616009 | 1/1949 | United Kingdom | 374/138 |
| 0788319 | 12/1957 | United Kingdom | 374/135 |

OTHER PUBLICATIONS

A. Hill; NASA Tech. Briefs, MFS 29199, Feb. 1988; Mechanics Hardware, Techniques, and Processes; Vortex Suppressors Reduce Probe Vibrations.

Max Jakob; Copyright 1949 (Printed May 1962); Heat Transfer; pp. 217, 218, 229, 230, and 231.

Design News, Design Cuts Sensor's Response Time; Charles J. Murray; pp. 176-177. (Mar. 25, 1991).

Two Sheets with Figs. (A)-(D) showing views of temperature probe subassembly types; Manufactured and sold by Rosemount Inc. (No Date).

Primary Examiner—William A. Cuchlinski, Jr.
Assistant Examiner—Diego F. F. Gutierrez
Attorney, Agent, or Firm—Westman, Chaplin & Kelly

[57] ABSTRACT

A temperature probe measures the temperature of a fluid which moves relative to the probe. The probe includes a housing, a transducer, and one or more fins. The housing has a bore with a bore axis and carries at least a portion of the fluid along the bore axis. The transducer has a sensing length, and the fin thermally couples to the transducer along substantially the entire sensing length. The fin is also substantially aligned with the bore axis to promote laminar flow of the fluid in the bore. In a preferred embodiment the transducer is held within a protective tube, and the fin attaches to the tube along a fin inner edge. The fin also attaches along a fin outer edge to a radiation shield encircling the tube, the fin outer edge being shorter than the fin inner edge.

14 Claims, 5 Drawing Sheets

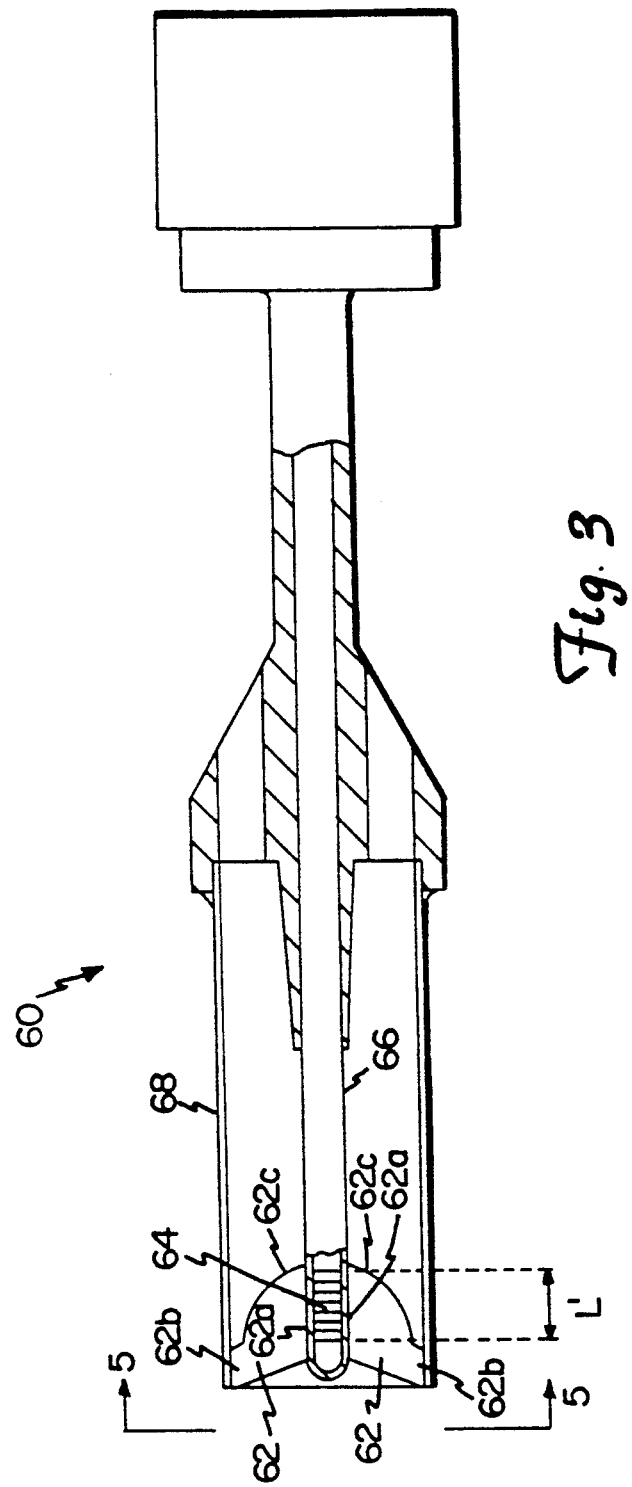

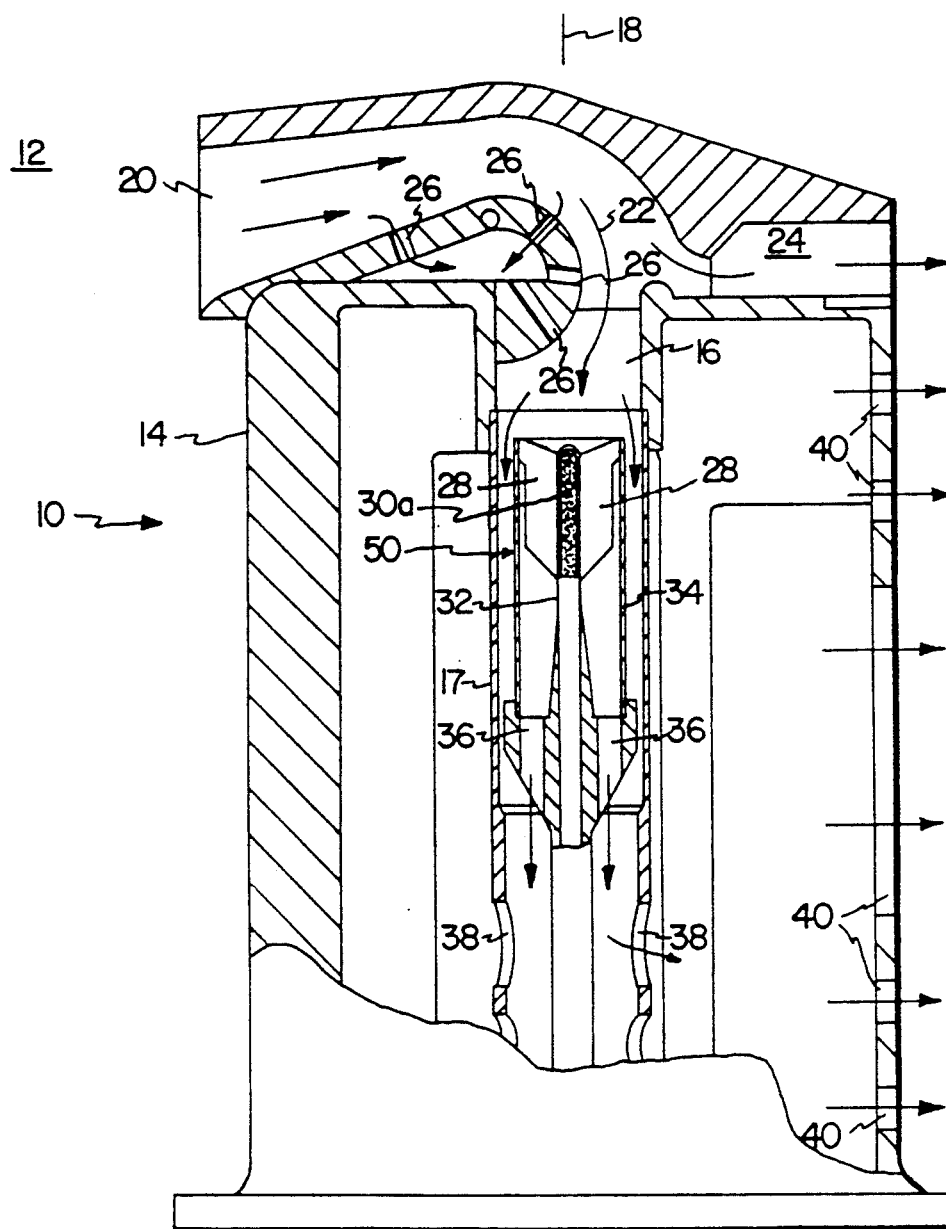
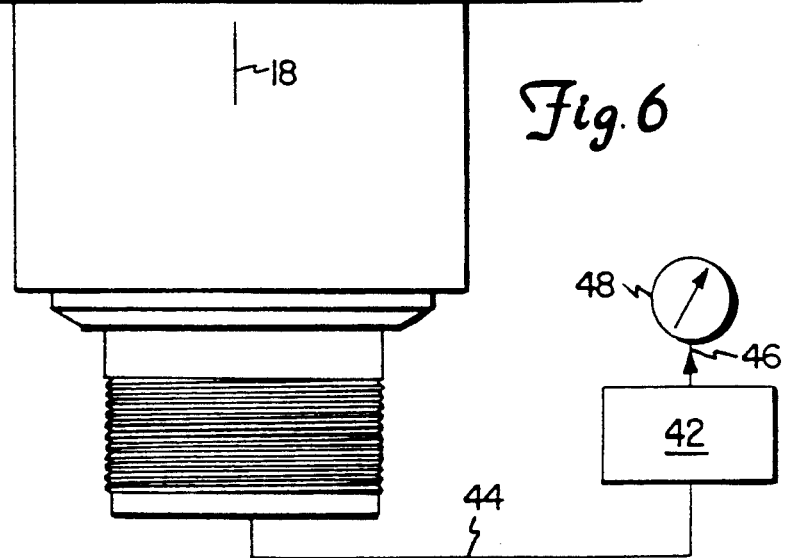
Fig. 6

5,302,026

TEMPERATURE PROBE WITH FAST RESPONSE TIME

This is a continuation of application Ser. No. 07/915,016 filed on Jul. 16, 1992, now abandoned.

BACKGROUND OF THE INVENTION

This invention relates to temperature probes, and in particular to those temperature probes which measure the temperature of a fluid moving relative to the probe.

BRIEF SUMMARY OF THE INVENTION

In the present invention, a temperature probe includes one or more fins thermally coupled to a transducer along substantially a full sensing length of the transducer. The fin or fins are disposed to enhance convective heat transfer between the transducer and a fluid moving relative to the probe, and to promote laminar flow of the fluid. The probe further includes a housing having a bore with a bore axis, the housing carrying at least a portion of the fluid along the bore axis. The fins are disposed in the bore, and in a preferred embodiment attach to a tube in which the transducer is located. The fins enhance the convective heat transfer by increasing an effective surface area-to-mass of the transducer, thereby quickening a response time of the transducer to a transient flow condition. In a preferred embodiment, the fin attaches to the tube along a fin inner edge and has a trailing fin edge which tapers at an acute angle to the fin inner edge.

BRIEF DESCRIPTION OF THE DRAWINGS

FIG. 3 is a side elevational view partly broken away and sectioned of a portion of an alternate embodiment of a temperature probe subassembly in accordance with the invention;

FIG. 6 is a view of an alternate embodiment of the temperature probe of FIG. 1.

DETAILED DESCRIPTION OF THE PREFERRED EMBODIMENTS

Figure 1:
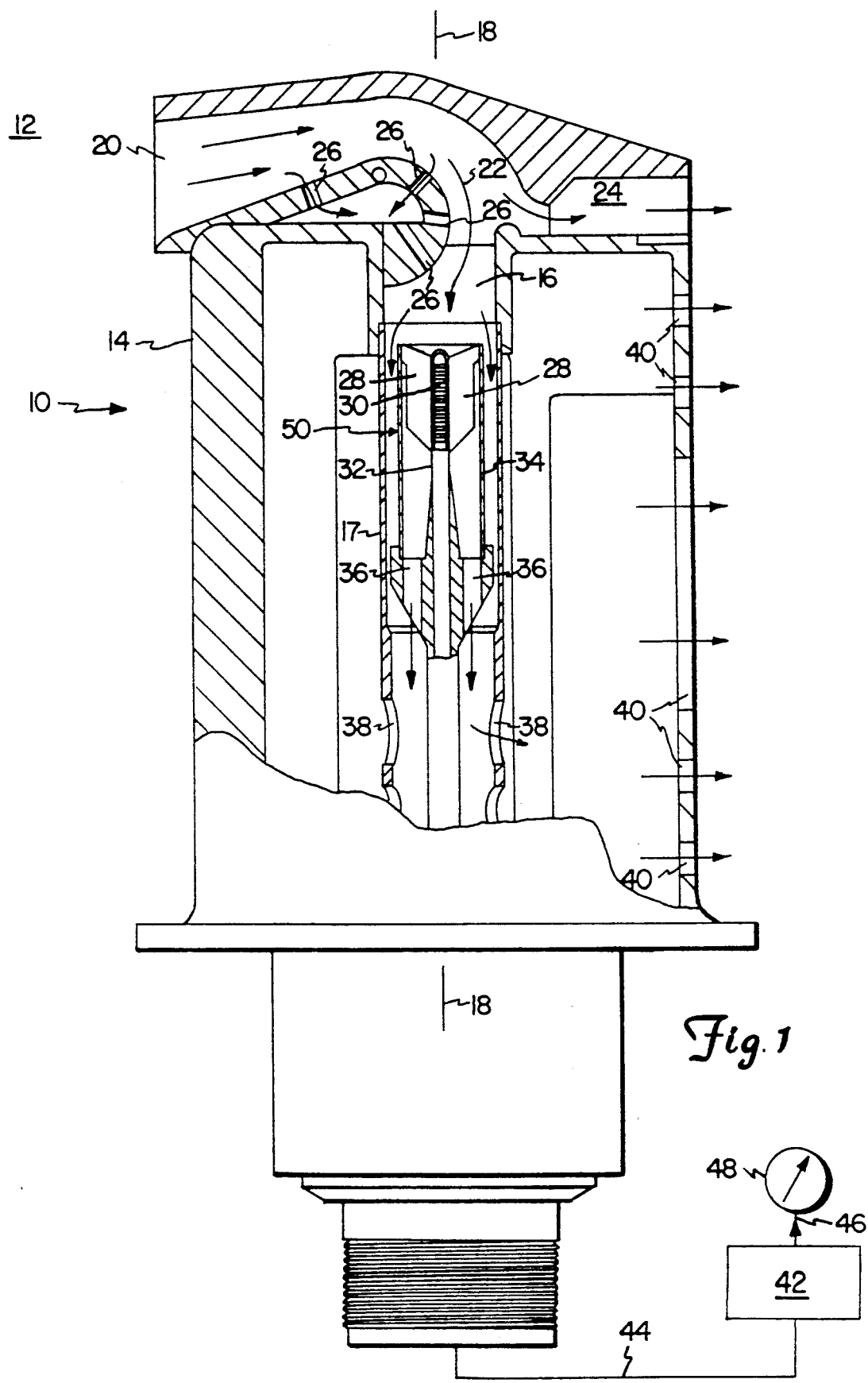
FIG. 1 is a side elevational view partly broken away and sectioned of a temperature probe in accordance with the invention.

In FIG. 1, temperature probe 10 measures the temperature of a fluid shown generally at 12. Preferably, probe 10 mounts on an air vehicle and measures total air temperature. Probe 10 includes a housing 14, which has a bore 16 of a generally cylindrical shape and aligned along a bore axis 18,18. The fluid enters opening 20 in housing 14, and at least a portion of the fluid generally follows arrow 22 into bore 16. Another portion of the fluid, along with debris including water droplets, if present, passes through the housing via cavity 24. Still other portions of the fluid flow through holes 26 to reduce undesirable boundary layer effects. This and other aspects of preferred housings for use with the present invention are taught in U.S. Pat. No. 2,970,475, which is incorporated herein by reference.

Fluid 12 undergoes adiabatic heating when its speed is reduced by housing 14. The heated fluid flows at least partially into bore 16 along bore axis 18, encountering a probe subassembly 50 which includes fins 28 thermally coupled to a transducer 30. Probe subassembly 50 also preferably includes a tube 32 and a radiation shield 34. In ruggedized embodiments of the invention, transducer 30 is preferably housed in tube 32 which is closed to protect the transducer against corrosion and other harmful influences. Some of the heated fluid flows inside radiation shield 34, an open-ended member, coming into contact with fins 28 and tube 32. This fluid then passes through holes 36 in a lower portion of the probe subassembly, through holes 38 in bore 16 and exits probe 10 via holes 40. Other portions of the heated fluid flow between radiation shield 34 and bore wall 17, passing through holes 38 and exiting probe 10 Via holes 40.

According to the invention, the fluid transfers heat to transducer 30 not only directly or through tube 32, but also via fins 28. Fins 28, in effect, increase an effective surface area of transducer 30 exposed to the fluid flow, thereby enhancing thermal coupling of the transducer to the fluid. This enhanced thermal coupling improves the time response of the transducer and reduces errors due to competing thermal effects such as stem conduction or radiation heat transfer.

Figure 2:
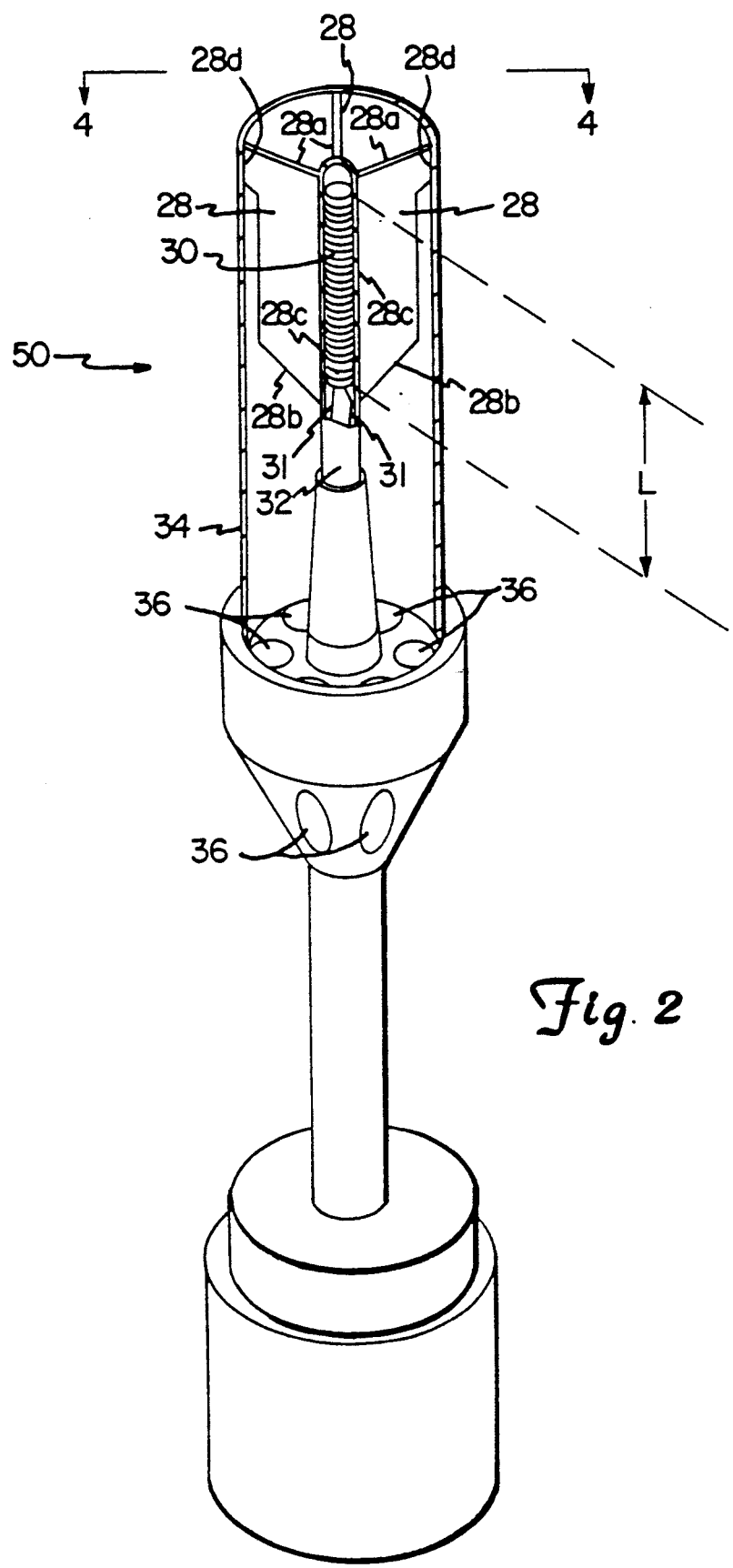
FIG. 2 is a perspective view partly broken away of a temperature probe subassembly taken from FIG. 1.

Fins 28 are preferably composed of a high thermal conductivity material such as copper, and are thermally coupled to transducer 30 along substantially an entire sensing length L of transducer 30 (see FIG. 2). If composed of copper, fins 28 also preferably include a thin coating of a corrosion-resistant material such as nickel to prevent degradation of the copper. Fins 28 are also sufficiently thin so that the effect on the probe of the additional fin mass (tending to slacken the probe time response) is smaller than the effect of the additional fin surface area (tending to quicken the probe time response) to yield a net quickening of the probe time response to changes in fluid temperature. Fins 28 preferably have a substantially planar shape and are aligned with bore axis 18 for reasons discussed below.

FIG. 2 shows enlarged the temperature probe subassembly 50 from FIG. 1. Although each fin 28 contacts the fluid along an entire length of the fin, heat transfer from the fluid to the fin and vice versa occurs predominantly at a leading fin edge 28a of each fin. Comparatively little such heat transfer occurs at a trailing fin edge 28b. For this reason, trailing fin edge 28b is preferably tapered at an acute angle relative to a fin inner edge 28c, along which fin 28 attaches to tube 32. Such tapering permits reduced fin mass but retains heat conduction from leading fin edge 28a through fin 28 to transducer 30 along substantially its entire length L. Attachment of fin 28 to tube 32 is preferably by a braze or weld joint for ruggedness.

Transducer 30 has a thermally responsive characteristic and a sensing length L. Preferably, transducer 30 is a resistance temperature device (RTD) comprising a length of platinum wire wound around a cylinder of high resistivity material such as aluminum oxide. In such case, the thermally responsive characteristic is the electrical resistance of the RTD, and probe 10 includes wires 31 connecting transducer 30 over line 44 to a circuit means 42 for measuring the resistance of the RTD and providing an output 46 as a function thereof. Output 46, indicative of the temperature of fluid within bore 16, can be used in a closed-loop control system or displayed on an indicator 48. In other embodiments, such as in FIG. 6, transducer 30a comprises other known temperature transducers such as a thermocouple or a quantity of luminescent material.

Temperature probe 10 also preferably includes radiation shield 34 encircling tube 32 and fins 28. Fluid flowing along inside and outside surfaces of radiation shield 34 heats or cools it in like manner to fins 28, tube 32, and ultimately transducer 30. In some circumstances shield 34 attains temperatures which, although close enough to the temperature of transducer 30 to act as an effective radiant heat shield, may deviate from the transducer temperature.

Fins 28 preferably attach to radiation shield 34 at fin outer edges 28d to secure transducer 30 against vibration. Fins 28 thus serve a dual purpose: they enhance thermal coupling of transducer 30 to the fluid, and they also provide mechanical support for transducer 30. Fin outer edges 28d are as short as practical, preferably much shorter than edges 28c, to reduce conductive heat transfer between transducer 30 and shield 34, thereby to make the transducer temperature more representative of the fluid temperature. Keeping fin outer edges 28d short also reduces the effective thermal mass of the transducer, thereby enhancing time response. In alternate embodiments, some or all of the fins can remain unattached to the heat shield to further reduce conductive heat transfer between the transducer and the radiation shield.

According to the invention, fins 28 are substantially aligned with bore axis is to promote laminar fluid flow rather than turbulent or swirling fluid flow. Turbulent fluid flow in the region between transducer 30 and radiation shield 34 is undesirable because it can increase thermal coupling between transducer 30 and shield 34 by convection of fluid portions between those members. Such increased coupling is undesirable because of temperature differences between the members as discussed above.

Figure 4:
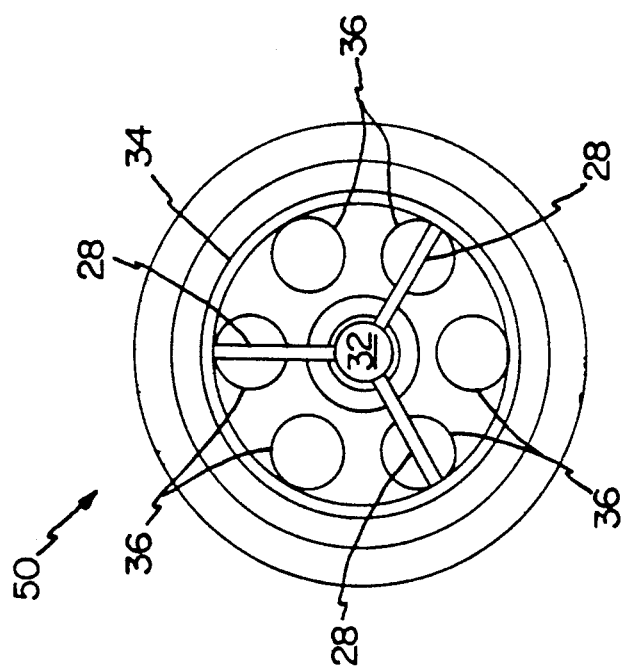
FIG. 4 is an end view taken along line 4—4 of FIG. 2.

FIG. 4 shows a view of probe subassembly 50 along line 4—4 of FIG. 2. The three fins 28, tube 32, radiation shield 34, and multiple holes 36 are clearly seen. Holes 36 can be circular in cross-section, as shown in FIG. 4, or they can have non-circular cross sections.

Figure 5:
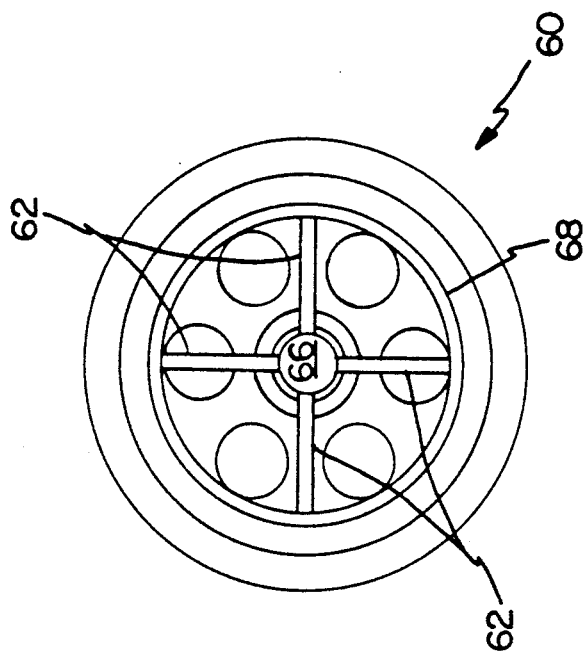
FIG. 5 is an end view taken along line 5—5 of FIG. 3.

FIG. 3 shows an alternate embodiment of a temperature probe subassembly 60 similar to the subassembly of FIG. 2. Probe subassembly 60 comprises fins 62 thermally coupled to a transducer 64 along its entire length L', as well as protective tube 66 and radiation shield 68. Fins 62 preferably attach to tube 66 along fin inner edges 62a and to radiation shield 68 along fin outer edges 62b by a braze or weld joint. As in the previous embodiment, trailing fin edges 62c taper at an acute angle relative to fin inner edges 62a. Subassembly 60, like subassembly 50, fits within a bore of a temperature probe housing such that fins 62 align with an axis of the bore. FIG. 5 shows a view of temperature probe subassembly 60 along line 5—5 of FIG. 3. The four fins 62 and neighboring members are clearly seen. Temperature probes according to the invention can of course have other numbers of fins, such as one, two, or more. An excessive number of fins can increase the cost of manufacturing the temperature probe, and placement of fins too close together, such that fluid boundary layers from surfaces of adjacent fins meet or touch, are not preferred.

The present invention has been described with reference to preferred embodiments. Workers skilled in the art, however, will recognize that changes may be made in form and detail without departing from the spirit and scope of the invention.

What is claimed is:

1. A probe for measuring a temperature of a fluid moving relative to the probe, comprising:
    a housing having a bore with a bore axis, the housing adapted to carry at least a portion of the fluid along the bore axis;
    a transducer having a thermally responsive characteristic, the transducer further having a sensing length; and
    at least one fin disposed in the bore and thermally coupled to the transducer along substantially the full sensing length;
    wherein the fin is thermally coupled to the transducer to a greater extent than any thermal coupling between the fin and the housing, and the fin is substantially aligned with the bore axis to promote laminar flow of the fluid.

2. The probe as recited in claim 1, further comprising:
    a tube disposed in the bore and thermally communicating with the fin and the transducer, the transducer being disposed in the tube.

3. The probe as recited in claim 2, wherein the fin attaches to the tube along a fin inner edge.

4. The probe as recited in claim 3, wherein the fin has a trailing fin edge, and wherein at least a portion of the trailing fin edge is tapered at an acute angle to the fin inner edge.

5. The probe as recited in claim 1, the fin comprising a substantially planar copper member with a coating of corrosion-resistant material.

6. A probe for measuring a temperature of a fluid moving relative to the probe, comprising:
    a housing having a bore with a bore axis, the housing adapted to carry at least a portion of the fluid along the bore axis;
    a transducer having a thermally responsive characteristic, the transducer further having a sensing length; and
    a plurality of fins disposed in the bore and thermally coupled to the transducer along substantially the full sensing length;
    wherein the fins are thermally coupled to the transducer to a greater extent than any thermal coupling between the fins and the housing, and the fins are substantially aligned with the bore axis to promote laminar flow of the fluid.

7. The probe as recited in claim 6, further comprising:
    a tube disposed in the bore and thermally communicating with the fins and the transducer, the transducer being disposed in the tube.

8. The probe as recited in claim 7, wherein the thermal coupling of each fin to the transducer is achieved by attachment of each fin to the tube along a fin inner edge.

9. The probe as recited in claim 8, further comprising an open-ended member disposed in the bore, the open-ended member encircling the tube and the fins.

10. The probe as recited in claim 9, wherein each fin attaches to the open-ended member along a fin outer edge, and wherein the fin outer edge is shorter than the fin inner edge.

11. The probe as recited in any one of claims 1, 6, or 10, further comprising:
    system means for detecting the thermally responsive characteristic to provide an output as a function thereof; and display means for displaying the output.

12. The probe as recited in either of claims 1 or 6, wherein the transducer comprises a wound length of platinum wire.

13. The probe as recited in either of claims 1 or 6, wherein the transducer comprises a quantity of luminescent material.

14. A probe for measuring a temperature of a fluid moving relative to the probe, comprising:

a housing having a bore with a bore axis, the housing adapted to carry at least a portion of the fluid along the bore axis;

a transducer disposed in the bore and having a thermally responsive characteristic, the transducer further having a sensing length; and at least one fin disposed in the bore and mechanically coupled to the transducer by an inner edge of the fin along substantially the full sensing length;

wherein at least a portion of an outer edge of the fin is spaced apart from the housing to reduce conductive heat transfer therebetween and the fin is substantially aligned with the bore axis to promote laminar flow of the fluid.

* * * * *